(12) United States Patent
Artois et al.

(10) Patent No.: US 6,185,912 B1
(45) Date of Patent: Feb. 13, 2001

(54) PROCESS FOR THE MANUFACTURE OF A PACKAGING BLANK

(75) Inventors: August Artois, Erps-Kwerps (BE); Lars Georg Howald Brus, Jarfälla; Magnus Renman, Tyresö, both of (SE); Wim Wouters, Wiljgmaal (BE)

(73) Assignee: SCA Packaging Limited (GB)

( * ) Notice: Under 35 U.S.C. 154(b), the term of this patent shall be extended for 0 days.

(21) Appl. No.: 09/297,390

(22) PCT Filed: Oct. 31, 1997

(86) PCT No.: PCT/GB97/02999

§ 371 Date: Jul. 9, 1999

§ 102(e) Date: Jul. 9, 1999

(87) PCT Pub. No.: WO98/19275

PCT Pub. Date: May 7, 1998

(30) Foreign Application Priority Data

Oct. 31, 1996 (GB) .................................................. 9622712

(51) Int. Cl.[7] ....................................................... B65B 43/08
(52) U.S. Cl. ............................. 53/456; 493/8; 364/474.24
(58) Field of Search ...................................... 493/8, 51, 52; 53/456; 364/474.24

(56) References Cited

U.S. PATENT DOCUMENTS

| | | | |
|---|---|---|---|
| 3,948,152 | * 4/1976 | Nolan et al. | 493/8 |
| 4,817,005 | 3/1989 | Kubota | 364/468 |
| 4,875,187 | * 10/1989 | Smith . | |
| 5,980,440 | * 11/1999 | Mitman et al. | 493/52 |

FOREIGN PATENT DOCUMENTS

| | | | |
|---|---|---|---|
| 0 402 475 A1 | 12/1990 | (EP) | G06F/15/60 |
| 2 712 999A1 | 6/1995 | (FR) | G06F/17/50 |

OTHER PUBLICATIONS

Chuang, S.H. et al., "Feature Decomposition from Solid Models for Automatic Flattening," *Computer Aided Design*, vol. 28, No. 6/7, pp. 473–481, 1996.

* cited by examiner

*Primary Examiner*—Eugene Kim
(74) *Attorney, Agent, or Firm*—Testa, Hurwitz & Thibeault, LLP

(57) ABSTRACT

A process for the manufacture of a packaging blank of sheet material, such as cardboard, for forming into a box is disclosed. Digitally stored details of a predetermined number of basic box shapes are displayed for selection in accordance with the items to be packaged. The selected basic shape then provides a number of basic designs of box based on the shape, from which a design is selected. A blank in accordance with this design is then displayed, for the user to make further modifications to the design. The details of the final design are stored digitally and used to control a cutting machine to reproduce the blank from sheet material.

13 Claims, 5 Drawing Sheets

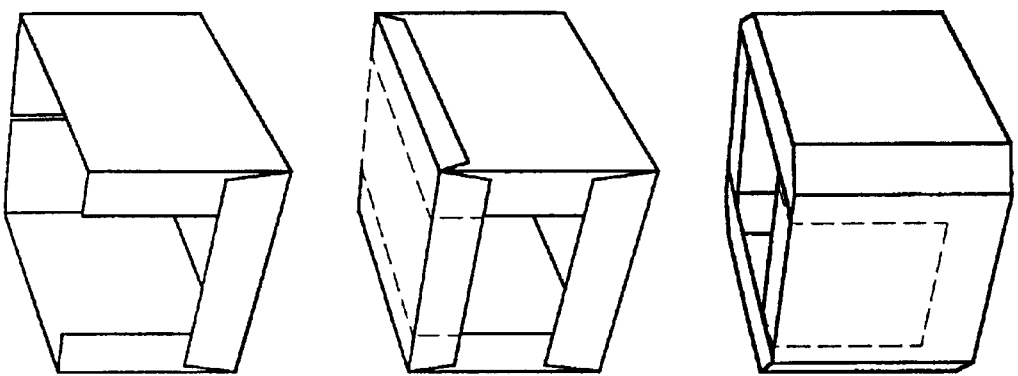
Fig. 3
  
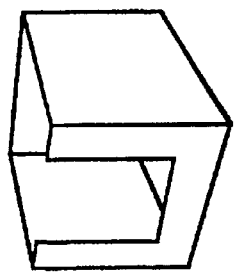 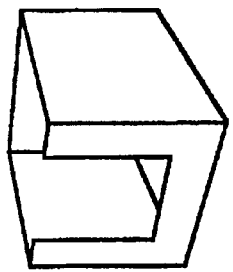 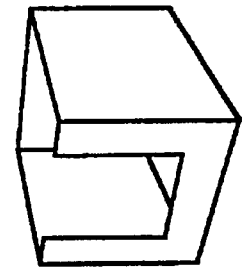
  
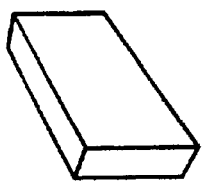 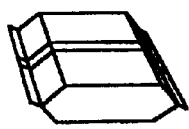 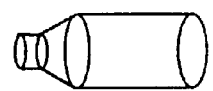

PROCESS FOR THE MANUFACTURE OF A PACKAGING BLANK

This invention relates to a process for the manufacture of a blank of sheet material to be folded into a box for the storage of one or more items.

It is well known to manufacture boxes for items out of blanks of cardboard or other flexible sheet material. The blanks are cut from large sheets of material by means of knives, lasers or other cutting means, under the control of suitable means such as a computer. These blanks are often designed by means of Computer Aided Design ("CAD") software, so that when folded they will create the desired design of box, and so that there is efficient use of the sheet material.

Boxes are frequently used as secondary packaging for a number of consumer items such as packages of foodstuffs, cleaning products and so forth which already have primary packaging. These items may themselves contain a number of units which are also wrapped. For example, a consumer may purchase a bag which contains a number of wrapped chocolate bars.

It is becoming increasingly common for boxes to be used not only for the storage and transport of items but also for their display. Boxes containing a number of units may be placed on supermarket shelves. They may serve as dispensers for the units and may be used to advertise the nature of the goods. This has meant that the purchasers of boxes, such as supermarket chains, are becoming increasingly concerned about the appearance of boxes and their functionality in terms of serving as dispensers where appropriate. These requirements have to be combined with basic functional requirements concerned with storage and transport, such as strength, the ability to be stacked, the ease of handling by workers and so forth.

It has therefore become necessary to make it easier to match these various requirements.

According to the present invention there is provided a process for the manufacture of a blank of sheet material to be folded into a box for the storage or transport of one or more items, comprising the steps of:

providing digitally stored details identifying a number of different types of item;

providing digitally stored details of a predetermined number of basic shapes of box, including at least one visual representation of each shape;

providing digitally stored relationships between the types of item and the basic shape or shapes suitable for the different types;

providing digitally stored details of basic designs of box which are based on the basic shapes, including at least one visual representation of each design;

entering details to identify one of the types of item;

where desired entering additional parameters concerning the type of item and/or the requirements of the box;

displaying a visual representation of the or each basic shape of box related to the type of item, taking into account any additional parameters entered;

selecting a basic shape of box;

where desired entering further parameters concerning the requirements of the box;

displaying a visual representation of the or each basic design of box based on the selected basic shape, taking into account any further parameters entered;

selecting a basic design of box;

creating a final design of box from the selected basic design;

generating and digitally storing information representing a two dimensional blank of sheet material to be folded to form the final design of box; and using that digitally stored information to control cutting means to cut the blank from a sheet of material.

The process of the invention allows a box to be manufactured based on the requirements of the end use of the box, rather than by selecting a box from an existing library of box design types, such as the "Fefco" standard, which may limit the routes for manufacture, erection or filling/closing of the box, including the type of machinery used and hence the cost, or indeed the suitability of the box to its end use. When using such known libraries the box design type is already prescribed, and any modification to rectify the foregoing limitations requires a change in design type, i.e. a further library selection, which is again entirely dependent on the skill and experience of the box designer to make a well informed decision. This is generally the current way box manufacture is specified. However, according to the invention, the box design to be manufactured may be specified largely automatically with reference only to the requirements of end use. Thus, manufacture of the box design may be achieved more quickly, more reliably and without depending on highly skilled and experienced input. In this way, entirely novel box constructions may be manufactured for a particular purpose.

In this manner it is possible to manufacture a blank which when folded will meet the requirements of the user of a box in terms of appearance and functionality.

The invention is particularly relevant in the manufacture of blanks for boxes which will be used as secondary packaging of consumer items which already have primary packaging, and which may be used to display or dispense the items. However, the process is also relevant to the packaging of single large items for example.

The system will store information concerning the standard types of item likely to be encountered. This may comprise information relating to the product concerned, such as food, beverages, cosmetics, cleaning products and so forth, and information about the form of the primary packaging such as can, bottle, or sachet and plastics, glass or metal. Initially a user of the system can be presented with information on e.g. a computer monitor which will enable the type of item to be selected. Text and/or graphical representations may be used. Once the user has defined the type of item and, optionally, any additional information such as a particular problem in terms of fragility or a particular need in terms of storage of boxes, the system will display the available types of basic box shape. Thus, on a computer monitor there could be provided pictures of the available shapes, or perhaps pictures of all shapes with the inapplicable ones greyed-out or the applicable ones highlighted. There could be a single picture of each shape, or a series of pictures. If desired, a moving three-dimensional animation could be used to display a shape from a number of angles.

When a basic shape is selected, further information may be entered if desired. This may concern how the boxes are to be stacked, the amount of protection required for the items and so forth. There are then made available for display a number of basic designs of box which follow the basic shape and meet the requirements. Representations of these designs may show flaps, if desired lids, fold lines, removable panels and so forth, taking into account that they are to be manufactured from blanks. From these basic designs it is possible to go to the appropriate blank on a design screen such as a computer monitor, generally using a CAD package.

The CAD package may be used for the final design, taking into account further requirements, dimensions and other parameters. This final design work will generally be carried out on a representation of the blank. The resultant information concerning the design will be stored digitally and then used to control cutting means in the manufacture of the blank.

In a typical installation, the process may involve a computer database, a presentation front end for selecting shapes and designs of box, and a CAD package for creating the final design of blank. These functions may be combined in one workstation, or involve a number of workstations which may be networked. By using e.g. object linking and embedding, it is possible to go from a basic shape on a presentation package to a design in a design database, and then to a CAD package for a selected design.

Elements of the invention will now be described in more detail by reference to the accompanying drawings in which:

FIG. 3 shows for three products how the same basic shape may result in different basic designs;

Figure 6:
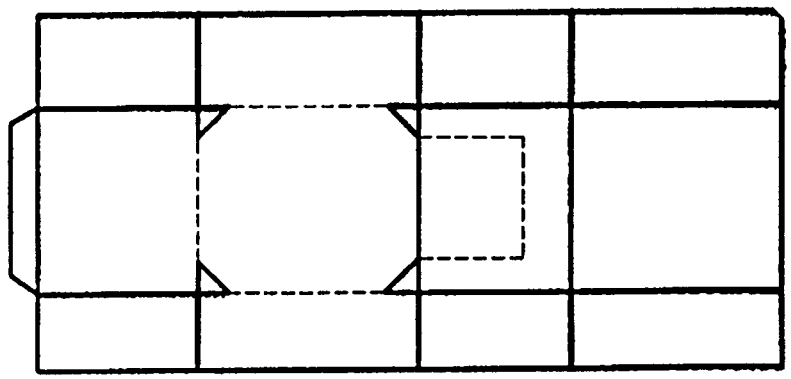

FIGS. 5 a, b, c and d show four different basic designs based on the basic shape of FIG. 5;

FIG. 6 shows a final design of a blank; and

Figure 7:
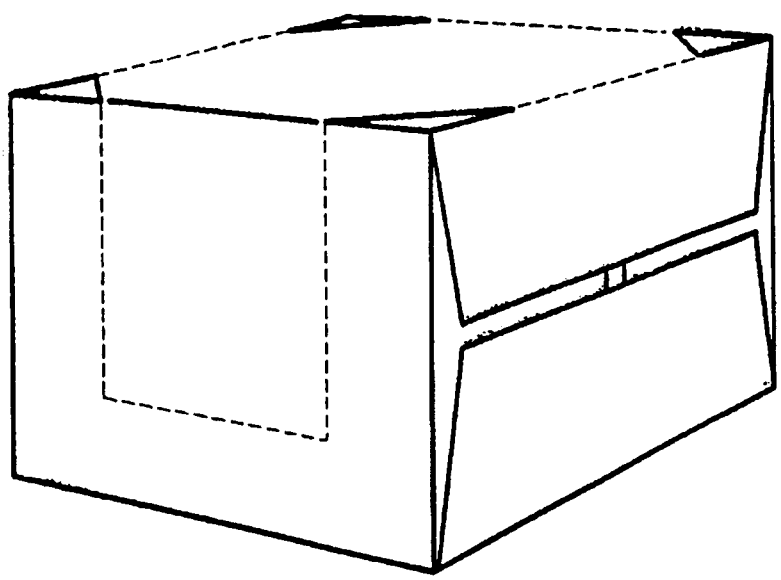

FIG. 7 shows a box which would be assembled from the blank of FIG. 6.

These shapes and designs illustrated in FIGS. 2 to 7 are not dedicated to the public and no permission is given to use them except: to the extent necessary for an understanding of the invention.

Figure 1:
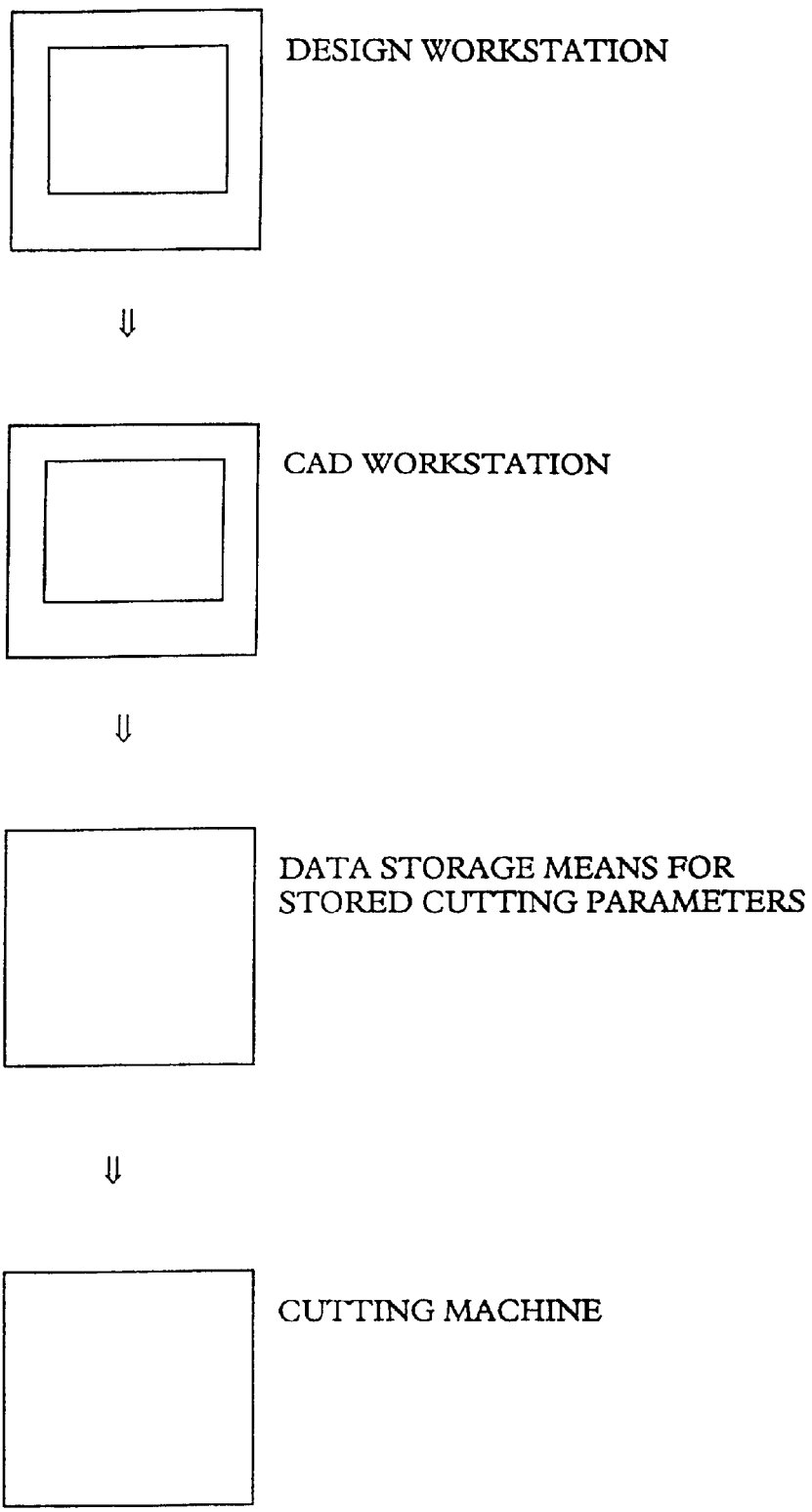
FIG. 1 shows the basic procedure for manufacturing the blank.

Referring to FIG. 1, there is shown in diagrammatic form the apparatus necessary to carry out the invention. There is a design work station, on which a user selects a basic shape and then a basic design. This may be a standard type of workstation with a database of shapes and designs. The database may be stored locally or on a server accessed by the workstation over a network. There is a CAD workstation, which receives basic design information from the design workstation, for a designer to complete the details of the design of the blank. This may have, for example, a larger and higher resolution display screen than the design workstation. The design and CAD workstations may be combined in a single unit.

The CAD workstation produces digital data for controlling a cutting machine. This may be stored on live data storage means such as a disk on a network, or may be stored on transportable data storage means such as a tape, CD-ROM or the like. The data is transferred to a cutting machine, where sheets of suitable material such as cardboard are cut into the blanks which will form the box of the desired shape.

Figure 2:
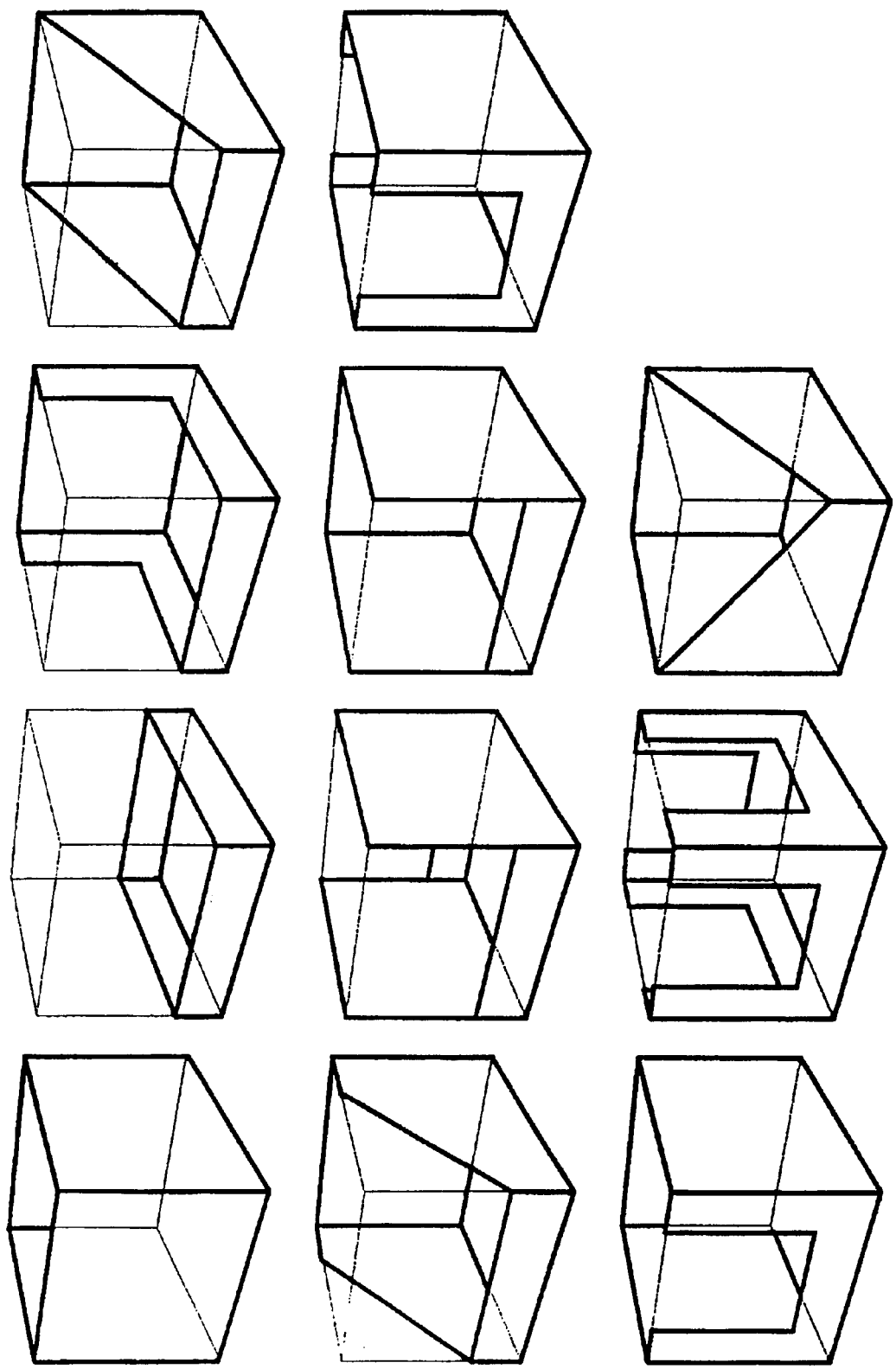
FIG. 2 shows eleven basic shapes of box.

Referring to FIG. 2, there are shown eleven basic shapes. These show the packages in the form after they have been opened as they will be used for display purposes. There is shown the outline of each box as it may be in its complete state, but more generally these outlines lines indicate the volume occupied by the primary items. It has been found that for consumer items to be sold in supermarkets and the like, these eleven basic shapes can meet all current requirements. It may be that a different number, such as ten or twelve would be acceptable.

FIG. 3 shows how the primary article to be packaged influences the basic design based on a single basic shape. In this case, the top line shows how the basic shape is modified to cope with cartons. Little protection is required and the basic design is simple. The middle line shows the packaging of flexible cartons containing liquids such as detergent. The basic design here provides a lid. The bottom line shows the packaging for bottles of liquids such as soft drinks, and in this case the top is open but provided with a rim to provide greater peripheral protection, the front and rear are closed in, and there is a removable panel.

Figure 4:
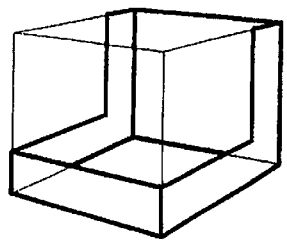
FIG. 4 shows a particular basic shape.
Figure 5A:
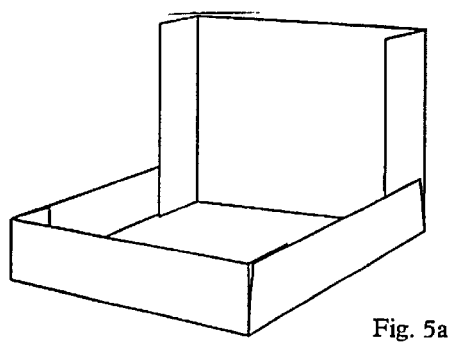
Figure 5B:
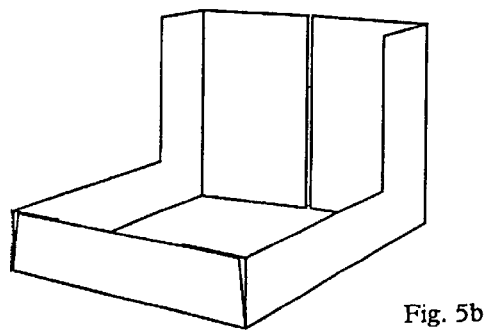
Figure 5C:
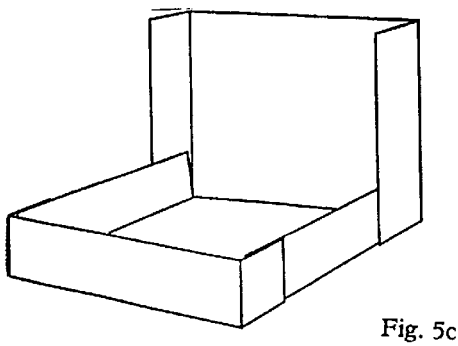
Figure 5D:
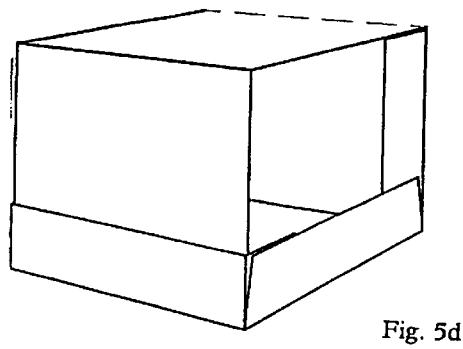

FIG. 4 shows how a basic box design, and FIGS. 5a to 5d show basic designs based on this shape. These would be presented to the user on the screen of the design workstation, together with an indication of the properties of the design, such as whether it can have a lid, stacking options and so forth. The details of the designs will be stored in a suitable database.

FIG. 6 shows a particular blank after it has been completed on the CAD workstation, and FIG. 7 shows a box made from this blank.

The CAD workstation may have access to a library of basic blank configurations, corresponding to the basic designs which are chosen on the design workstation. Whereas choosing the basic design will tend to be by means of visual representations of the box itself, on the CAD workstation a user will normally operate on the blank itself to add the final design features.

What is claimed is:

1. A process for the manufacture of a blank of sheet material to be folded into a box for the storage and transport of at least one item, comprising the steps of:

providing digitally stored details identifying a number of different types of items to be stored;

providing digitally stored details of a predetermined number of basic shapes for boxes, including at least one visual representation of each shape;

providing digitally stored relationships between the types of items and the basic shapes suitable for the different types of items;

providing digitally stored details of basic designs for boxes which are based on the basic shapes, including at least one visual representation of each design;

receiving details to identify one of the types of items;

receiving optional additional parameters concerning the type of item and the requirements of the box;

displaying a visual representation of each basic shape of box related to the type of item, taking into account any additional parameters received;

receiving a selection for the basic shape of the box from the basic shapes displayed;

receiving optional further parameters concerning the requirements of the box;

displaying a visual representation of each basic design for the box based on the selected basic shape, taking into account any further parameters received;

receiving a selection for the basic design of the box from the basic designs displayed;

creating a final design for the box from the selected basic design;

generating and digitally storing information representing a two dimensional blank of sheet material to be folded to form the final design of the box; and using that digitally stored information to control cutting means to cut the blank from a sheet of material.

2. A process as claimed in claim 1, wherein the predetermined number of basic shapes is between ten and twelve.

3. A process as claimed in claim 2, wherein the predetermined number of basic shapes is eleven.

4. A process as claimed in claim 1, wherein the step of creating the final design of box includes carrying out design work on a visual representation of the blank for the box.

5. A blank for making a box, manufactured by the process claimed in claim 1.

6. A blank for making a box, manufactured by the process claimed in claim 2.

7. A blank for making a box, manufactured by the process claimed in claim 3.

8. A blank for making a box, manufactured by the process claimed in claim 4.

9. A box manufactured from the blank claimed in claim 5.

10. A box manufactured from the blank claimed in claim 6.

11. A box manufactured from the blank claimed in claim 7.

12. A box manufactured from the blank claimed in claim 8.

13. A process for designing a blank of sheet material to be folded into a box for the storage and transport of at least one item, comprising the steps of:

provides digitally stored details identifying a number of different types of items to be stored;

providing digitally stored details of a predetermined number of basic shapes for boxes, including at least one visual representation of each shape;

providing digitally stored relationships between the types of items and the basic shapes suitable for the different types of items;

providing digitally stored details of basic designs for boxes which are based on the basic shapes, including at least one visual representation of each design;

receiving details to identify one of the types of items;

receiving optional additional parameters concerning the type of item and the requirements of the box;

displaying a visual representation of each basic shape of box related to the type of item, taking into account any additional parameters received;

receiving a selection for the basic shape of the box from the basic shapes displayed;

receiving optional further parameters concerning the requirements of the box;

displaying a visual representation of each basic design for the box based on the selected basic shape, taking into account any further parameters received;

receiving a selection for the basic design of the box from the basic designs displayed;

creating a final design for the box from the selected basic design;

generating and digitally storing information representing a two dimensional blank of sheet material to be folded to form the final design of the box.

\* \* \* \* \*